United States Patent [19]
Smith

[11] 3,771,020
[45] Nov. 6, 1973

[54] GROUND WIRE MONITORING CIRCUIT

[75] Inventor: Edward P. Smith, Mansfield, Ohio

[73] Assignee: The Ohio Brass Company, Mansfield, Ohio

[22] Filed: Oct. 30, 1972

[21] Appl. No.: 302,125

[52] U.S. Cl.................. 317/18 C, 317/52, 317/18 D
[51] Int. Cl. ............................................ H02h 3/00
[58] Field of Search.................. 317/18 C, 18 D, 52; 340/253 M, 253 N, 255, 256; 324/51

[56] References Cited
UNITED STATES PATENTS

| | | | |
|---|---|---|---|
| 3,697,809 | 10/1972 | Self.................................... | 317/18 C |
| 3,335,324 | 8/1967 | Buckeridge........................ | 317/18 D |
| 3,196,316 | 7/1965 | Crom.................................. | 317/18 C |

Primary Examiner—J. D. Miller
Assistant Examiner—Harvey Fendelman
Attorney—William C. Sessions et al.

[57] ABSTRACT

A ground wire monitoring circuit particularly adapted for use in connection with mining machinery that is supplied wither alternating current through a flexible cable from a power source remote from the machine. The cable contains phase conductors and a ground wire. The ground wire is energized by a voltage derived from the alternating current power supply at the location of the mining machine and any failure or opening of the ground wire circuit is detected by means adjacent the power source and the power circuit leading to the mining machine is immediately opened.

15 Claims, 1 Drawing Figure

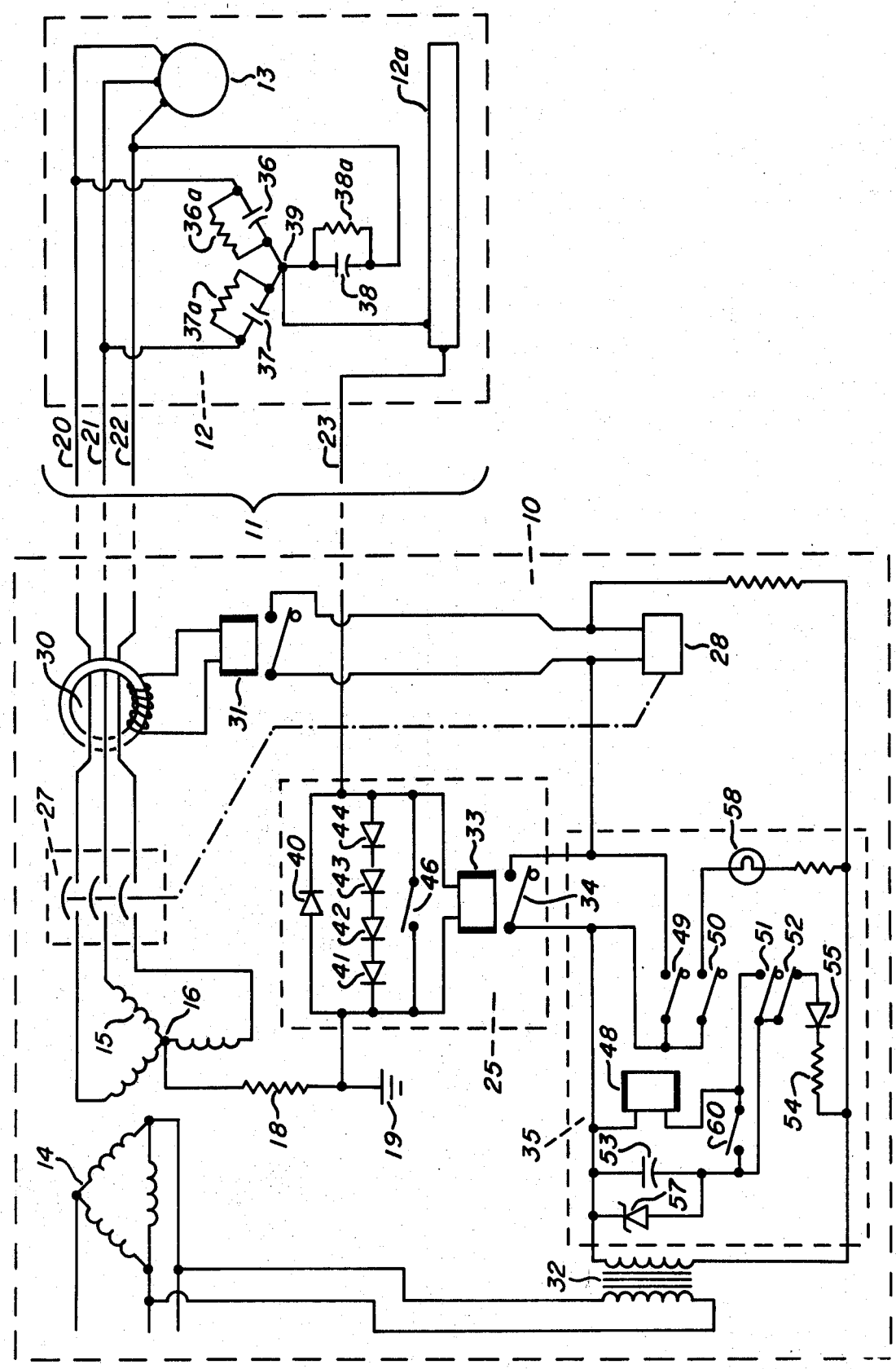

GROUND WIRE MONITORING CIRCUIT

BACKGROUND OF THE INVENTION

This invention relates to a ground wire monitoring system for continuously checking the integrity of a grounding circuit of a machine operated by electric power and disposed at a distance from a power source. The apparatus is particularly adapted for use with alternating current powered mining machines that are supplied by a flexible cable from a power source such as a transformer located in a power center that is remote from the machine.

Federal regulations require the use of such grounding circuits in connection with polyphase alternating current circuits that supply power to underground machines such as continuous coal mining machines. Grounding circuits conventionally include a conductor that extends along with the phase conductors in a flexible cable from the grounded neutral of a transformer at the power source to the frame of the machine and the circuit must include means for opening the circuit breaker at the power source immediately upon failure or breakage of the ground wire. This is essential to protect personnel from hazards that might arise due to failure of insulation in the machine or other fault and to prevent the machine frame from reaching a potential that could be dangerous to personnel who might be standing on the ground and touching the machine.

Ground wire monitoring circuits have been proposed in which the monitoring circuit has embodied a pilot wire that is utilized to complete a circuit with the ground wire in which a current is circulated. Failure of either the ground wire or the pilot wire results in the opening of the circuit breaker leading to the machine. Other systems have been proposed in which a rectifier disposed at the machine is employed to provide a DC current that is circulated through the ground wire and the phase conductors that provide the power to the machine. Failure of the ground wire causes an undervoltage relay to open and trips the circuit breaker.

SUMMARY OF THE INVENTION

A general object of the present invention is the provision of an improved ground wire monitoring system that does not require the use of a pilot wire. Another object is the provision of a system that prevents the appearance of dangerous voltages after the breaking of the ground wire and during the brief period before the main circuit breaker opens. Another object is the provision of such a system that embodies well-known and rugged components. Another object is the provision of a system having means for testing the operation of the system. A further object is the provision of circuit means for by-passing the system for a predetermined short period of time in order to enable the system to be reset safely. A further object is the provision of a system in which a sensitive relay can be employed without danger or damage to the relay under ordinary fault conditions or even by prolonged flow of the maximum current that can flow in the ground wire in the event of a line-to-ground fault.

Briefly, a preferred form of my invention contemplates a system in which an alternating current is derived from the phase conductors at the machine and circulated through the ground wire to the detecting system at the power source. An undercurrent relay is provided at the power source, the coil of the relay is shunted by diodes and the forward drop of the circulating current through the diodes provides the current that causes the under-current relay to pick up. If the relay drops out, the main circuit breaker is opened. Since the diodes shunt the coil of the relay, they provide protection for the relay coil in the event of a high current flow through the ground wire, such as may take place during a line-to-ground fault.

BRIEF DESCRIPTION OF THE DRAWINGS

The single FIGURE of the drawings is a circuit diagram of a preferred form of the invention.

DESCRIPTION OF THE PREFERRED EMBODIMENT

The drawing diagrammatically illustrates the present invention as adapted to a mine power system having a power source 10 connected by a flexible trailing cable 11 to a machine 12, such as a continuous mining machine having a frame 12a and embodying a motor 13 that is supplied with electrical power from the power source 10 through the cable 11.

As is usual in mine practice, the power source 10 may be considered as a portable substation and embodies a power transformer having a delta-connected primary 14 and a Y-connected secondary 15. The primary of the power transformer is connected to an external power source (not shown) and steps down the maine voltage, which may be, for example, from 2,400 volts to 15,000 volts to the voltate that is desired for operation of the machine 12, for example, 480 volts line-to-line or 277 volts line-to-ground. The neutral point 16 of the secondary 15 of the power transformer is connected to ground through a ground fault current limiting resistor 18 which, in accordance with usual practice, is designed to limit any ground fault current to about 25 amperes, this requiring a grounding resistor of 11 ohms in the example given. The resistor 18 is connected to a carefully constructed earth ground 19 that provides a good low resistance connection to the earth.

The flexible cable 11, which supplies power to the machine 12 and which may be as much as 500 feet or more long, contains three phase conductors 20, 21 and 22 and a ground wire 23 that leads from the machine frame to the ground wire monitoring system indicated in general at 25 and then to the grounded end of the ground fault limiting resistor 18.

The power source also contains a conventional circuit breaker 27 interposed in the phase conductors 20, 21 and 22. The circuit breaker opens in the event of excessive current flow and also has an undervoltage release 28 of conventional construction. The power source also embodies a conventional current transformer 30 to detect ground faults and operate a ground fault relay 31 that, when closed, shunts the coil of the under-voltage release 28 and results in the opening of the main circuit breaker 27. The coil of the undervoltage release is normally energized from the secondary of a transformer 32, the primary of which is connected across two of the conductors leading from the main three-phase power source to the primary 14 of the power transformer. This also is conventional.

The ground wire monitoring system 25 contains a ground wire monitor relay 33 which, as will appear more fully below, is maintained closed by the flow of current in the ground wire 23 and drops open, thus interrupting the current to the coil of the circuit breaker undervoltage release 28, whenever current ceases to flow in the ground wire 23. Reset circuits indicated in general at 35 are also provided at the power source to enable the main circuit breaker to be closed, which establishes the monitoring current in the ground wire 23.

In order to create a current flow in the ground wire 23, an alternating current voltage is derived at the machine from the phase conductors 20, 21 and 22. This voltage is low enough that it would not present any substantial hazard to an operator standing on the ground and touching the machine frame, and such voltages are hereinafter referred to as "low" voltages. This is preferably accomplished by Y-connected capacitors 36, 37 and 38 connected to the phase conductors 20, 21 and 22, respectively. If these capacitors were equal, there would be zero voltage at the center point 39. However, by making the capacitors unequal, for example, of 10, 10 and 13 microfarads capacitance, point 39 is given a voltage of about 30 volts above the system neutral in a 480 volt system. Resistors 36, 37 and 38 are connected across capacitors 34, 35 and 36. These resistors are provided to discharge the capacitors when the power circuit is opened for any reason, so that an operator will not receive an unpleasant shock in handling the capacitors after the power has been turned off. These resistors are of high value, for example, 390,000 ohms and are without substantial effect during the normal operation of the system.

Point 39 is connected to the machine frame which is connected to the ground wire 23, the earth ground 19 and the neutral point 16 through the resistor 18 as previously described. The potential above ground of point 39 provides a small current that flows in the ground wire and is used to indicate the continuity of the ground wire. The return flow is through the resistor 18, transformer secondary 15 and phase conductors 20, 21 and 22 to the capacitors 36, 37 and 38 and the point 39. In a typical system embodying 500 feet of No. 8 ground wire and with the detecting system to be described, the current is about one-third ampere. So long as the ground wire is intact, the machine frame and the point 39 are at a very small potential above ground, due to the voltage drop in the ground wire and in the monitoring system 25, as explained below. If the ground wire should break in the absence of a fault, the machine frame would be held to within 30 volts above ground for the brief period before the monitoring system 25 opens the circuit breaker 27.

As noted above, the ground wire monitoring system 25 is provided to determine whether current is flowing in the ground wire and to actuate the circuit breaker undervoltage release 28 in the event the ground wire current falls below a predetermined small amount. This is accomplished by causing the ground wire current to flow through a diode 40 that is adapted to conduct current in one direction (from the power source toward the machine in the example given) and series-connected diodes 41, 42, 43 and 44 that are connected in parallel with the diode 40 and that are adapted to conduct the current in the opposite direction (from the machine to the power source in the example given). The coil of the ground wire monitor relay 33 is shunted by diode 40 and the series-connected diodes 41, 42, 43 and 44. Thus, the voltage across the coil of relay 33 depends upon the forward drop across the diodes.

With a typical silicon diode the voltage drop across each diode is about 0.6 volts for forward currents of low value and this forward drop does not increase greatly even with substantial increases in current. Thus, in the example given, on one-hald cycle of the alternating current flowing in the monitor wire 23 in the direction in which diode 40 is conducting and which is hereinafter referred to as the "negative" direction, the voltage drop would be about 0.6 volts. On the next half cycle, when the series connected diodes 41, 42, 43 and 44 are conducting, the voltage drop is the total forward drop across the four diodes or about 2.4 volts in what is hereinafter referred to as the "positive" direction. Relays are readily available commercially that will reliably pick up and close their contacts 34 under the voltages that result from the one-third ampere current flowing in the ground wire. So long as contacts 34 are closed and the contacts of the ground fault relay 31 are open, current is supplied to the undervoltage release 28 of the circuit breaker 27 and hence the circuit breaker can be closed and will remain closed until the happening of an event that wil cause it to open.

Thus, as long as current is flowing in the ground wire 23, the ground wire monitor relay 33 will maintain its contacts 34 in closed condition and in the absence of closing of the ground fault relay 31 or another event that would cause the circuit breaker 27 to open, the circuit breaker 27 will be maintained closed. However, if the connection between the machine frame and ground through the ground wire 23 is opened or seriously impaired, the voltage across the ground wire monitor relay 33 will drop to zero or very nearly zero and the relay will drop out, opening the circuit from the secondary of transformer 32 to the circuit breaker undervoltage release 28 and thereby opening the circuit breaker 27. With this circuit, any failure of the ground wire 23 or of the monitoring system 25 will result in cutting off the voltage across the undervoltage release 28 and the opening of the main circuit breaker 27.

In order to provide for testing the operation of the ground wire monitor relay 33, the circuit breaker undervoltage release 28 and the main circuit breaker 27, a test switch 46 is connected across the coil of relay 33. If the relay and the undervoltage release are operating correctly, closing this switch will cause contacts 34 of relay 33 to drop open, interrupting the circuit to the circuit breaker undervoltage release 28 and causing the main circuit breaker 27 to open.

After the main circuit breaker 27 has been opened for any reason, it is necessary to provide a brief period of time during which the main circuit breaker 27 may be reset and the flow of current re-established in the ground wire 23. This is accomplished by the reset circuit indicated in general at 35 which comprises a by-pass relay 48 having normally open contacts 49, 50 and 51, and normally closed contacts 52. So long as contacts 52 are closed, capacitor 53 is kept charged by a circuit comprising a resistor 54 and a diode 55 connected across the secondary of transformer 32 in series with capacitor 53, the voltage on the capacitor being limited by a zener diode 57 to 36 volts, for example.

In order to reset the system, a reset button or switch 60 is provided. Closing this switch connects capacitor 53 across the coil of by-pass relay 48, which then picks up, opening the normally closed contacts 52 and closing the normally open contact 49, 50 and 51. Closing the contacts 49 closes the circuit to the circuit breaker undervoltage release 28 and thus makes it possible to close the circuit breaker 37. Closing the contacts 50 completes a circuit to the indicator lamp 58 showing that it is possible to close circuit breaker 27, while opening contact 52 opens the charging circuit to the capacitor 53. Closing the circuit through contacts 51 holds the connection of the capacitor 53 across the coil of relay 48 even though the push button 60 may be released.

The circuit is such that after about three seconds the charge on capacitor 53 will be dissipated through the coil of relay 48 to such an extent that the voltage across capacitor 53 will drop low enough to cause by-pass relay 48 to drop out. If during this period of time the operator closes the main circuit breaker 27, flow of current will be established promptly in the ground wire 23 and the contacts 34 of the ground wire monitor relay 33 will close, completing the normal circuit from the transformer 32 to the undervoltage release 28 and placing the system in operation. When the by-pass relay 48 drops out, the contacts 49, 50, and 52 return to their normal positions as shown in the drawing and the values of the components are chosen so that a period of about 10 seconds is required to recharge the capacitor 53 for another operation. Thus, the operator is given a short period of time, which is limited by the design of the circuit and is beyond the control of the operator, in which to reset the main circuit breaker 27. Repetitive pushing or holding of button switch 56 cannot cause malfunction since the relatively low resistance of the coil of relay 48 keeps the capacitor 52 from charging to a high enough voltage to pick up the relay. If any component of the relay circuit fails, the relay will not pick up and the main breaker cannot be reset.

To summarize the operation of a power system embodying the present invention, the system is placed in operation by the operator depressing the reset switch 60. As soon as the lamp 58 has lighted indicating that the by-pass relay 48 has operated, the operator knows that he has a short period of time in which to close the main circuit breaker 27. As soon as the circuit breaker 27 is closed, a small current due to the voltage derived from the unbalanced capacitors 36, 37 and 38 flows through the ground wire 23. The forward drop of the diodes 40 and 41, 42, 43 and 44 created by the flow of the current through ground wire 23 is sufficient to cause the ground wire monitor relay 33 to pick up and close its contacts 34, thus picking up the under-voltage release 28 of the main circuit breaker 27 and maintaining the main circuit breaker closed. So long as the system is in normal operation, the ground wire then maintains the machine frame at a very low voltage above ground and there is no hazard to the operator.

In the event of a ground fault detected by the current transformer 30, the ground fault relay 31 closes, thus opening the circuit breaker undervoltage release and opening the main circuit breaker 27. In the short period of time between the occurrence of the ground fault and the opening of the main circuit breaker, the ground fault current through the ground wire 23 is limited by the ground fault current limiting resistor 18 and the voltage of the machine frame above ground is limited to a low value by the ground wire. It is to be noted that with a back-to-back arrangement of the diodes 40 and 41, 42, 43 and 44, the only impedance offered to flow of current through the diode circuit is the forward drop of the diodes and since the forward drop increases only slightly even though the current through the ground wire may be increased very substantially, there will be no unduly large voltage impressed on the ground wire monitor relay 33 and the relay windings will not be damaged even though the ground fault and the current flow through the wire 23 may persist for some considerable period of time before the main circuit breaker 27 is opened. Furthermore, the current flow through ground wire 23 is limited to a reasonable value (25 amperes in the example given) by the resistor 18.

In the event of a failure of the ground wire 23, or a failure in the monitoring system, the ground wire monitor relay 33 promptly drops out and the main circuit breaker is opened. This will occur regardless of the location of the failure and regardless of what component of the system may have failed. In the event of a failure or in the event the power suppoy to the machine is cut off for any reason, the capacitors 36, 37 and 38 will be discharged by the resistors 36a, 37a and 38a so that the danger of an operator receiving an unpleasant shock from these capacitors is eliminated shortly after shut down takes place. During the very brief interval between breakage of the ground wire 23 or any other failure in the ground wire monitoring system and the opening of circuit breaker 27, the voltage on the machine frame will not exceed safe levels. For example, in the system described having a 277 volt line to neutral voltage and with capacitors of 10, 10 and 13 microfarads, the machine frame voltage will not exceed 30 volts above ground.

The system can be tested by means of the test switch 46. The resetting system provides for convenient and foolproof resetting of the main circuit breaker and insures that the ground monitoring system also will become operative within a very few seconds after the reset switch has been depressed and the main circuit breaker closed.

From the foregoing description of a preferred form of the invention, it will be evident that the invention provides a fail-safe system for monitoring the integrity of ground wires and that failures anywhere in the ground wire or the ground wire monitoring system will result in prompt opening of the main circuit breaker. The system can be tested conveniently and reset conveniently and does not involve subjecting the operators of the machines to any dangerous or unpleasant shocks.

It is to be understood that the foregoing description of a preferred form of the invention is given by way of example and that various changes and modifications can be made therein without departing from the teachings of the invention. The essential characteristics of the invention are defined in the appended claims.

What is claimed is:

1. A ground wire monitoring circuit for a polyphase current power system comprising a power source having a transformer providing a system neutral point, a ground for the system to which said neutral point is connected, a ground fault current limiting resistor interposed between the neutral point and the system ground, phase conductors to transmit power to an electric power consuming apparatus having a frame and a ground wire extending from the frame of the apparatus to the power source and connected to the system ground, and a main circuit breaker for said phase conductors, said monitoring means comprising means disposed at the power consuming apparatus for deriving a low voltage from said phase conductors and impressing it on the machine frame to raise the potential of the machine frame above ground by a low voltage thereby causing a current to circulate through the ground wire, the ground fault limiting resistor, the transformer at the power source and the phase conductors, and current detecting means disposed adjacent the power source and adapted to open said circuit breaker at any time that the current flow in said ground wire is below a predetermined minimum value, said current detecting means comprising at least two diodes connected in parallel in said ground wire and arranged to conduct in opposite directions, a ground wire monitor relay connected across said diodes whereby the forward voltage drop across the diodes is applied to said ground wire monitor relay, and circuits associated with said ground wire monitor relay for opening the main circuit breaker whenever the forward drop is below a predetermined value.

2. Apparatus according to claim 1 wherein the circuit breaker is provided with an undervoltage release and the ground wire monitor relay opens a circuit leading to the undervoltage release in the event that the current flow in the ground wire is reduced below a predetermined value.

3. Apparatus according to claim 1 wherein the means for deriving a low voltage at the machine comprises unbalanced capacitors connected in Y form to the phase conductors and to a central point.

4. Apparatus according to claim 3 having a resistor shunted across each of the capacitors.

5. Apparatus according to claim 1 wherein the current detecting means comprises one solid state diode connected in the ground wire circuit to conduct in one direction and a series made up of a plurality of solid state diodes connected in parallel with the said one diode and adapted to conduct in the opposite direction, the voltage across the ground wire relay means consisting of the voltage drop across the one diode during one half cycle of current and the total voltage drop across the series of diodes during the opposite half cycle of current flow.

6. Apparatus according to claim 1 having a test switch which, when closed, connects a shunt across the monitoring relay means.

7. Apparatus according to claim 2 having means for resetting the circuit comprising circuit means at the power source for supplying a voltage to the circuit breaker undervoltage release, a normally open by-pass relay for controlling said circuit means, the by-pass relay when energized closing said circuit means whereby a voltage is supplied to said undervoltage release, and a reset switch for controlling said by-pass relay.

8. A system according to claim 7 wherein closing the reset switch connects a capacitor across the coil of the by-pass relay and thereby closes the by-pass relay, the capacitor being charged from said circuit means.

9. A circuit according to claim 8 wherein the charging circuit for the capacitor is opened when the by-pass relay is closed, whereby the charge of the capacitor leaks off through the coil of the by-pass relay, whereby the by-pass relay will be opened after the expiration of a predetermined period of time.

10. Apparatus according to claim 9 having an indicator lamp that is lighted when the by-pass relay is closed, thereby giving an indication to the operator that the main circuit breaker may be reset.

11. In a ground wire monitoring circuit for a polyphase alternating current power system comprising a power source having a transformer providing a neutral point, a ground fault current limiting resistor interposed between the neutral point and the system ground, phase conductors to transmit power to an electric power consuming apparatus having a frame, and a ground wire extending from the frame of the apparatus to the power source and connected to the system ground, means disposed at the power consuming apparatus for deriving a low voltage from said phase conductors and impressing it on the machine frame to raise the potential of the machine frame above ground by a low voltage thereby causing a current to circulate through the ground wire, the ground fault limiting resistor, the transformer at the power source and the phase conductors, said means comprising unbalanced capacitors connected in Y form to the phase conductors and a central point, said central point being connected to the machine frame.

12. Resetting means for a ground wire monitoring circuit for an electric power system comprising a power source interposed between the transformer neutral and the system ground, conductors to transmit power to an electric power consuming apparatus having a frame and a ground wire extending from the frame of the apparatus to the power source, a main circuit breaker for said power conductors having an undervoltage release, and means for monitoring the continuity of the ground wire and to open the circuit breaker if the ground wire continuity is interrupted, said resetting means comprising circuit means at the power source for supplying a voltage to the circuit breaker undervoltage release, a normally open by-pass relay for controlling said circuit means, the by-pass relay when energized closing said circuit means whereby a voltage is supplied to said transformer and to said undervoltage release, and a reset switch for controlling said by-pass relay.

13. Resetting means according to claim 12 wherein closing the reset switch connects a capacitor across the coil of the by-pass relay and thereby closes the by-pass relay, the capacitor being charged from said circuit means.

14. Resetting means according to claim 13 wherein the charging circuit for the capacitor is opened when the by-pass relay is closed whereby the charge of the capacitor leaks off through the coil of the by-pass relay, whereby the by-pass relay will be opened after the expiration of a predetermined period of time whether the reset switch is open or closed.

15. Resetting means according to claim 14 having an indicator lamp that is lighted when the by-pass relay is closed, thereby giving an indication to the operator that the main circuit breaker may be reset.

* * * * *

UNITED STATES PATENT OFFICE
CERTIFICATE OF CORRECTION

Patent No. 3,771,020          Dated November 6, 1973

Inventor(s) Edward P. Smith

It is certified that error appears in the above-identified patent and that said Letters Patent are hereby corrected as shown below:

In the Abstract, line 3, change "wither" to --with--.

Column 2, line 28, change "maine" to --mine--, line 30, change "voltate" to --voltage--.

Column 3, line 20, change "36, 37 and 38" to --36a, 37a and 38a-- line 21, change "34, 35 and 36" to --36, 37 and 38--.

Column 4, line 3, change "one-hald" to --one-half--, line 20, change "wil" to --will--, line 64, change "contact" to --contacts--.

Column 5, line 19, after "50," insert --51--, line 27, change "56" to --60--.

Column 6, line 15, change "suppoy" to --supply--.

Signed and sealed this 27th day of August 1974.

[SEAL]
Attest:

McCOY M. GIBSON, JR.          C. MARSHALL DANN
Attesting Officer              Commissioner of Patents